Jan. 16, 1968 R. L. OLSON 3,363,870
ARTICLES OF BUBBLE-ENCLOSING PLASTIC OR PLASTIC ELASTOMERS
Filed April 29, 1963
2 Sheets-Sheet 2

INVENTOR.
Richard L. Olson
BY
Hill, Sherman, Meroni, Gross & Simpson
ATTORNEYS

United States Patent Office 3,363,870
Patented Jan. 16, 1968

3,363,870
ARTICLES OF BUBBLE-ENCLOSING PLASTIC OR PLASTIC ELASTOMERS
Richard L. Olson, Chicago, Ill., assignor to Dike-O-Seal, Incorporated, Chicago, Ill., a corporation of Illinois
Filed Apr. 29, 1963, Ser. No. 276,463
8 Claims. (Cl. 248—358)

This invention relates broadly to fluid-filled bubble-containing and unitary bodies or articles or articles substantially of a deformable plastic material forming an outer phase to enclose the bubbles and form the walls between them, said articles being preferably of a simple extrudable shape which can be simply cut, or a shape which has parallel extruded sides and parallel cut ends substantially perpendicular to its sides for use in various different applications. Such shapes are often desirably cylindrical or disk-like. This invention also relates to the interrelated final assembly of such bodies with their engaging members, to their continuous-extrustion manufacturing method, and to the process for their said final assembly.

More specifically, this invention relates to such articles of elastomeric material and of generally ring-like or hollow cross-sectional shapes, with at least a material part of the bubble-enclosed fluid being a compressible gas.

In general, such bodies are only partially confined in their operative or final assembly, in which they are deformed by relative motions between at least two other rigid members. In the case of a plastic material, such deformation may be permanent for such purposes as energy absorption. However, in many applications of this invention, the body is desirably of elastomeric material to be elastically deformed or distorted. In many cases, bodies under this invention have one or more other degrees of freedom or other types of limited motions in addition to that producing their primary deformation.

In other but interrelated aspects thereof, this invention also relates to methods and articles for reducing by bubbles the effective spring rate in one region of an elastically deformed elastomeric body, and to a two or multistage blowing to selectively decrease the plastic or elastomer density or stiffness in one region relative to another.

This invention includes certain of the subject matter of my co-pending application Ser. No. 123,917, filed May 26, 1961, and the entire disclosure thereof is hereby incorporated herein by this reference, as is the disclosure of my prior U.S. Patent 2,815,549, as well as the disclosures of U.S. Patent 2,768,407, and U.S. Patents 2,283,316, 2,299,- 593, and 2,291,213, relating to two-stage forming of unicellular or bubble-containing elastomers.

Articles or bodies of the general shapes described above, usually of solid plastic or elastomeric material, have been commercially made for many years for various different applications or uses. In general, they are operatively secured in place (by bonding, cement or frictionally) for deformation in use in an assembly of at least two relatively movable and more rigid structural members. Previously known elastomeric articles of such types (or their assemblies) have had various deficiencies or limitations of cost or in service and have presented difficulties or undue costs in their initial manufacture and in their final assembly. Such problems have existed for many years. There have been various different types of attempts to solve them over these years. However, these attempts have been commercially unacceptable for various reasons, despite the rapid and great increase of pertinent technology during the past decade or more and despite the co-existence, as a material, of adequate and commercially used unicellular or bubble-holding plastics or elastomers and their related methods of manufacture.

One general and preferred type of applications and assemblies in which the present invention is particularly advantageous relates to primarily torsionally-deformed ring-like or hollow cylindrical elastomeric bodies as used in torsional springs (for vehicles and other purposes), in bushings (as a non-lubricated bearing and vibration or noise isolator for automotive suspension linkages or for other purposes), in dampers or shock absorbers or in torsional type vibration isolators to mount vibrating units such as engines or alternatively to mount a unit such as an instrument or control to be isolated from vibrations or shocks.

In concentric or inner and outer mounted types of such devices, a ring-like or hollow cylindrical elastomeric body is operatively secured to and between male and female portions of structural elements such as arms or links to provide the primary torsional and shear type deformation of the elastomer. Desirably the elastomer is often relatively free or unconfined at one or both ends to permit a lesser and secondary axial deformation, also in shear, and often to permit a limited radial or eccentric type motion by compression and tension of the elastomeric material in the ring.

Bodies of solid rubber or other suitable elastomer have been used commercially in such cases. Sponge or open cell elastomer would be unduly weak (or would employ an unduly large amount of elastomer) in such applications, since here the elastomer is non-continuous or is interrupted to form easy starting points for tears or cracks. It is also undesirable for other reasons including the absorption of dust and foreign matter or undesirable fluids into the pores. While it has been proposed to cast solid elastomer in situ (or secured in the final use position), yet cost and other considerations (including the providing of additional needed confinement) have precluded this in almost all cases.

In general, such torsional bodies have been initially separately formed in mass production, usually by multi-cavity molding, to permit the making of the usually needed complex shapes or other than plain cylindrical shapes with straight cut ends. These last simple shapes, usable under the present invention, preclude the need for such more costly and complex shapes. In some applications, such torsional bodies are cemented or otherwise bonded in place after final assembly, while in other applications (and for lowest cost of devices such as automotive bushings) they are frictionally held by radially outward resilient pressure against the female s'ructural portion and by radially inward resilient pressure against the male stuctural portion.

Both of these general types of securing have given rise to problems, including unduly high assembly cos's and limitations in service. Since a solid elastomer is substantially non-bulk-compressible, it must in service elongate and be held normally stretched axially if the ring-like body is to be held compressed radially in order to get its initially larger outer diameter into the smaller diameter hole of the female portion with a wrinkle-free and adequately tight and pressure-holding fit to maintain static friction or for good cementing or the like. This is not easy or feasible to do in low cost and rapid mass production assembly. Further, it necessarily produces material and undesirable outward bulges (or outwardly convexly-curved surfaces) at the unconfined axial end or ends.

In such devices (for example, in springs), it is often desirable and important to have a relatively long torsional deflection. Heretofore, such a long travel has been difficult to obtain commercially. For energy absorbing devices, it is also important to have a low effective spring rate or a maximum travel with low springiness, so as to provide a corresponding maximum of energy absorbing travel and thus give more internal friction in the elastomer. Such low spring rates have also been difficult to obtain commercially or in practical low cost devices. One reason is that the durometer of usable elastomers cannot be reduced below a practical lower limit without giving undue permanent set or flow. Further, this travel is undesirably reduced by the above-noted stress concentration and also be the above-noted axial stretch and the resulting increase of the torsional spring rate. These conditions also increase the peak service stresses in the elastomer and so weaken it, requiring more elastomeric material in a larger assembly.

Still other problems and limitations arising from the use of solid elastomers in such torsional bodies include the radially outwardly increasing amount of solid elastomer to be moved in shear, with its greater stiffness and the correspondingly radially inwardly increasing shear stresses. Thus the uniform elastomer is most highly stressed adjacent its radially inner surface. Also, there is a maximum and abrupt discontinuity or stress concentration at this point, tending to cause failure here. This has been particularly true in simple and lowest cost cylindrical shapes of uniform axial length.

In contrast to this radially varying stress, it is desirable to work or stress the elastomeric material substantially uniformly in order to use it all to advantage. For such reasons, such bodies have often had special and more costly shapes, one of which included tapered ends to provide axially shorter lengths for the radially outer portions. However, such remedies require relatively costly shaping or individual molding. Further, special end shapes do not cure the axially central stress conditions in a body of substantial axial length. For similar reasons, it has been proposed to use different elastomers or mixes (in layers or progressively changing) to provide relatively reducing spring rates (stiffness or durometers) in the radially outer portions. Such use of multi materials has been too complex and costly and has required about the same total weight of elastomer.

A closely related problem relates to failures or breaking away of the securing or bonding of the radially inner surface, due to the above-noted inner stress concentration. Various expedients have been proposed to alleviate or remedy such difficulties, but they have not fully commercially met or adequately solved these problems.

Another and closely related type of application to which the present invention applies relates to generally ring-like or hollow cylindrical bodies as described above, but in which the primary or a main deformation is axial. In such cases, the torsional deformation may be one of the secondary degrees of freedom. As will be apparent to those skilled in this art, these primarily axially deformed applications will have many of the same inherent difficulties or problems as those discussed above. These include shear stress concentrations at, or adjacent, the smaller area of the radially inner surface.

Still another and closely related type of application using the above-described radially inner and outer engaged surfaces may have an eccentric or radial motion for the primary deformation in spring or damping devices or in lateral-freedom-providing devices such as freely-floating dust covers or seals for a rotary shaft. Here again, the inherent problems and difficulties are well known in the art and include many of those discussed above, such as the ones arising from undesirable central stress concentration at or adjacent the smaller inner area to be engaged.

Another general category of applications in which this invention is useful includes such bodies which are to be primarily deformed axially, in compression or in tension. In such cases, the body itself may if desired be only a non-hollow disk or the like, secured to at least one of the two members which are to engage it. Certain non-limiting examples may include stacks of disks interleaved with secured metal members for heat dissipation, as energy absorbing crash pads, as tension or compression spring devices, or as seals, gaskets, or the like, including the compressible sealing or closure member on the valve or valve seat of a valve or the like (such as a faucet valve washer).

Alternatively, such a body may be secured at its flat ends to two relatively movable members to be stressed in shear between them. While such arrangements may not involve the difficulties arising from the smaller radially inner engaged area and the adjacent stress concentration, yet they often have certain of the inherent difficulties known in the art or as discussed above and including stress concentrations adjacent the engaged surfaces. Another is the tendency to fail at an exposed or free surface which is stressed.

It will be apparent that this invention is also useful in devices involving combinations of the above-noted types or arrangements. As only one example, an elastic and energy absorbing engine mount (or the like) may have the relatively movable members secured to radially inner and outer surfaces, and may have one of them also secured to (and at least partially confining) an axial end surface of the elastomeric body to give axial support or weight holding. It will also be apparent from the foregoing that devices under this invention may advantageously involve either permanent deformation of a body of liquid and/or gas bubble containing plastic (as for crash pads, bumpers, or like devices), elastic deformation of a body of liquid and/or gas bubble containing elastomer, or combinations of these several types.

Accordingly, and with the foregoing in mind, the general objects of this invention are to solve or at least reduce the above-noted or other known problems or difficulties of the prior art, to provide improved performance features in deformable plastic bodies by certain particular inclusions of bubbles therein. They are also preferably to provide such bodies at lower cost by reason of simple extrudable cut shapes which permit continuous low cost manufacture and lower cost and simpler final assemblies. All of this is to be without material sacrifice of service or performance features. Further, all of this preferably includes the provision of such interrelated continuous extrusion processes and such assembly methods.

Other more general objects of this invention relate to the provision of methods for, and articles embodying, a second or subsequent stage blowing, or further expansion of, bubbles in a previously set or stiffened matrix of plastic material or of elastomeric material in a selective or particular region in contrast to other regions thereof, and also relate to the provision of interrelated methods and articles wherein the provision of more and/or larger bubbles in a certain or selective region of a plastic or elastomeric matrix of a permanently or elastically deformable body to modify or to reduce its effective bulk strength or its spring rate, thereby tending to equalize bulk stress distribution, or for other reasons.

More specific objects of this invention are to provide bodies, articles, or assemblies and preferably inter-related manufacturing methods and assembly processes, all relating to bodies of plastic for permanent deformation or service and, more particularly, of elastomers for resilient deformation in service, and having:

Means, in such bodies of any shape, including more readily-deformable fluid-filled bubbles (by more or larger such bubbles), which bubbles are located to reduce the stiffness or effective bulk spring rate in a particular region to increase its deformation travel in service to thereby provide more nearly equal deformation through larger portions of such bodies, to more efficiently utilize the plastic or elastomeric material or for other purposes;

Parallel and extrudable sides with cut skin free ends for such bodies containing fluid and especially low gage pressure gas-filled bubbles or with high gas pressures to give progressively increasing spring rates;

Lower cost and better properties in the articles by more efficient manufacturing by continuous extrusion and shaping, preferably including the selective positioning of bubble and/or variations in their sizes, and with cutting to form ends with special wear and failure-resistant properties, free of stiffening means;

Such bodies in improved assemblies of one or of two, more rigid members and more economic and easier assembly processes therefor including both thermal, softened assembly procedures and room-temperature, bulk deformation assembly procedures;

And combinations of such more specific objects and features.

Numerous other objects, features and advantages of the present invention for use in the mentioned types of application, and also in still other known uses or applications not specifically mentioned herein, will become apparent to those skilled in the art from a consideration of the foregoing problems and discussion taken with the following more detailed description and the claims, all as illustrated in the accompanying drawings.

Turning now to a detailed consideration of certain exemplary forms of this invention, which are to be considered in the light of the above-noted difficulties or problems and their remedies resulting from the several aspects and the potentialities of this invention, the several figures will be described and discussed together with disclosures as to the practice of this invention in only certain of its various possible forms.

In connection with these several figures, it is first to be noted that the bodies covered by this invention are intended to be deformed in service. In general, they are intended to better or to solve the problems or difficulties of the types indicated above. These improvements may be either in the body, in its assembly, and/or in its manufacture or assembly operations. As will be apparent from the foregoing discussion of problems or the like, the deformations may be of various types, such as in shear, by rotary or axial motion, in tension or compression, or, as is more usual, with mixtures of these several deformations, with one usually being a primary one.

The bodies according to this invention may be of a plastic material of any suitable type which has a soft or at least partially flowable condition for its forming and shaping with the bubbles therein, after which it is set or stiffened (as by chilling from a hot molten or softened condition or as by catalyst or acid setting). In general the term plastic is used herein as generic to an elastomer and particularly in referring to its final or set condition to distinguish from such materials which have relatively little resilience or elasticity. Thus the latter material are often used in bodies or devices when only the general stiffness or strength is desired or for a permanent or one use deformation, such as controlled failure for a crash energy-absorbing device.

In contrast, the plastic material may also be an elastomer (such as rubber or a rubber-like material) for use in elastically deformable bodies or assemblies of various types as noted above. In both plastic and elastomeric such bodies, the deformation may involve a distortion.

Figure 1:
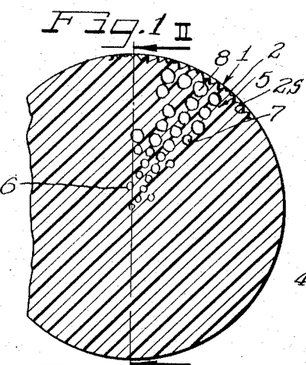
FIGURE 1 is a partially broken-away transverse section through a body of plastic or elastomeric material according to this invention.
Figure 2:
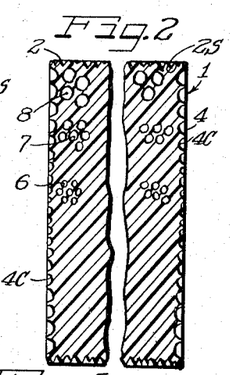
FIGURE 2 is a partially broken-away longitudinal or axially central section through the same body as FIGURE 1, taken on the line II—II of FIGURE 1.

FIGURES 1 and 2 show a typical such body, designated as a whole by 1, having the outer sides 2 (which are here straight, parallel and extrudable) and having the axial ends 4 (here shown as cut perpendicularly to the parallel sides 2). Such a body may be of any suitable length (or thickness), depending on the desired application. Within the broader aspects of this invention, the body of FIGURES 1 and 2 (or the bodies of the other figures hereof), may be of various desired shapes and may be made by various known or suitable techniques.

Body 1 preferably unitary (i.e., of one integral piece and of a common material without breaks, interruptions, or the like) and of a suitable plastic or elastomer which forms a continuous (or non-interrupted) strength-providing the outer phase or matrix as well as the common walls between fluid-filled bubbles or the like, the bubbles being indicated as a whole by 5. They are necessarily somewhat schematically indicated in exaggerated sizes. They may have different effective concentrations (i.e., different sizes and/or numbers of bubbles) as indicated by regions 6, 7 and 8, which may be progressively merging.

It is to be noted that these different types of bubble containing bodies, with all or at least some of the useful features as disclosed herein, may be made by any known or suitable methods or manufacturing techniques within the broader purview of this invention. However, it is preferred to make them by the interrelated continuous extrusion and shaping methods as disclosed herein for lower cost manufacture and to provide better articles, all as discussed below.

For convenience in manufacture, the bubbles under this invention (such as 5) are often of somewhat randomly varying sizes and with somewhat varying spacings or common and deformable wall thicknesses between them. These bubbles may, in certain cases, be of various somewhat irregular or not exactly spherical forms, such, for example, as are sometimes formed by the use of blowing powders or agents as disclosed in the above referenced patents or in my referenced copending application.

It is desirable and important that these bubbles, particularly in materially deformed or stressed regions, be of the type and of the range of sizes as disclosed and claimed in my above-referenced S.N. 123,917 and in certain cases of the sizes and types disclosed in the above-noted U.S. Patent 2,768,407. To avoid unduly lengthening this specification, such disclosures are not repeated.

However, it may also be noted that in the practice of this invention for differing applications and requirements there may desirably be large variations in the sizes and/or spacings between such bubbles (as from a heavier duty type, dense and stiff crash absorption bodies or spring bodies with small fluid or gas volumes in the bubbles on the one hand to a very flexible or low spring rate and long travel vibration absorber or isolator on the other hand, which last would desirably have a relatively large percent of its volume in bubble-enclosed fluid or gas in its deformed regions).

Bubbles, such as 5, may be used in such bodies for different purposes. One such purpose or effect is to reduce the stiffness of a plastic or the effective spring rate of an elastomeric matrix for the body as a whole. In such cases the bubbles may be relatively uniform in their sizes and spacings throughout the body, although this effect is also given when the sizes of the bubbles vary across a dimension of the body.

Another and different such purpose and effect is to reduce the effective stiffness or rigidity or the like of a plastic matrix (or the effective bulk spring rate of an elastomer) in one particular region in contrast to other regions. This, for example, may also serve to reduce stress concentrations in said other regions or give a much more nearly equal or uniform amount of bulk deformation or bulk stress distribution across the major deformed portions of such a body. This last is illustrated by the radially outermost bubbles 8 which are of larger average effective sizes (or diameter) and also may be more closely spaced, both to provide a materially lower bulk stiffness or spring rate in this outer region.

In contrast, the inner region has smaller size and fewer bubbles 6, so as to be more rigid and have a stiffer spring rate. The middle region has bubbles 7 in between these two extremes. Preferably, the sizes and/or spacings of the bubbles (or the effective elastomeric density) may vary progressively across the radius of body 1. As disclosed below, this variation may change inversely proportionally to the changing radius. Here there is a desired minimum stiffness per unit volume adjacent the center.

The term "bulk" is used here to indicate that a unit volume of the bubble-containing plastic or elastomer may be deformed or reduced in volume by distortion of the bubble interwalls and by compression of gas in the bubbles. In a shear deformation there is a complex set of distortions of the fluid-filled bubbles and their inter-walls.

In order to provide readily distortable bubble (and bubble inter-walls) for either of these two general effects, it is desirable that the bubbles contain a relatively freely flowing fluid. For higher energy absorption, as in a vibration-absorbing device, the bubbles may be filled with a more viscous liquid (such as a silicone liquid of suitable viscosity having little variation of its viscosity with temperature).

However, only a liquid in the bubbles will let them distort relatively freely but not compress. That is, it prevents material reduction in the bulk volume. In contrast, if the bubbles are at least partly filled with a gas, the gas can be compressed to permit a material reduction in bulk volume, which often occurs as least a resulting deformation in cases such as shear. The use of only or mainly gas in the bubbles not only permits the use of the preferred methods of manufacture (as discussed below), but also gives a minimum resistance to bubble shape deformation. This last is much improved if the gas is at a low pressure relative to the atmosphere (i.e., at a low gage pressure) in normal use conditions of such bodies or their assemblies. Accordingly, this condition is preferred when large bulk deformation or low effective stiffness is desired.

It is also to be particularly noted that such low bubble gas pressures permit large changes in internal gas volumes (or large deformations of the bubble enclosing walls) without any large or material gas spring effects. Put another way, such low gas pressures permit the stiffness or springiness of the inter-walls and their internal friction to provide the only material or effective forces occuring during deformation, since the gas bubble shapes may not only distort but also collapse relatively freely.

This is not only useful in service for long-travel vibration-absorbing devices, but also for the peripheral shortening of the outer sides in a room-temperature and deformation type assembly of a body into a smaller diameter and more rigid female member.

In contrast, the bubbles may be wholly or partly filled with gas at a pressure which, in service, is material relative to the stiffness of the plastic or elastomer. Here the bubble gas compression plays a major part in the combined action, or the elastic forces exerted by the body upon bubble-compressing deformation thereof. As disclosed in my copending S.N. 123,917, this will provide an often very desirable, progressively increasing spring rate upon deformations that compress the bubbles by a primary deformation or indirectly, as in a shear or torsional deformation. In general, such higher gas pressures will materially stiffen the spring rates or stiffness or all or of part of a body.

It is contemplated that various other or known or suitable means for the above-noted two purposes (or to provide more nearly equal deformations to reduce stress concentrations in use, or for other such purposes) may be provided in such bodies under this invention. Such known means are often either in the plastic material or by reason of its shape. However, according to this invention such means preferably also includes (or is provided entirely by), the provision of bubbles which are materially more readily deformed than their plastic or elastomeric matrix, and which are specially located for such purposes. From this disclosure, it will be apparent to those skilled in this art that such bubbles may be so used or arranged in various different ways.

Preferably, but not necessarily under all aspects of this invention, such plastic or elastomeric bodies have generally straight, parallel and extrudable sides such as 2. These extrudable sides, which are shaped while the material is soft or at least partly in a plastic or flowable condition, may include only the radially outer surfaces of non-hollow bodies, or else both the outer and radially inner surfaces of generally ring-like bodies. Often such solid or hollow bodies are desirably of generally circular cross-section, or are at least generally cylindrical in shape.

Figures 13, 15:
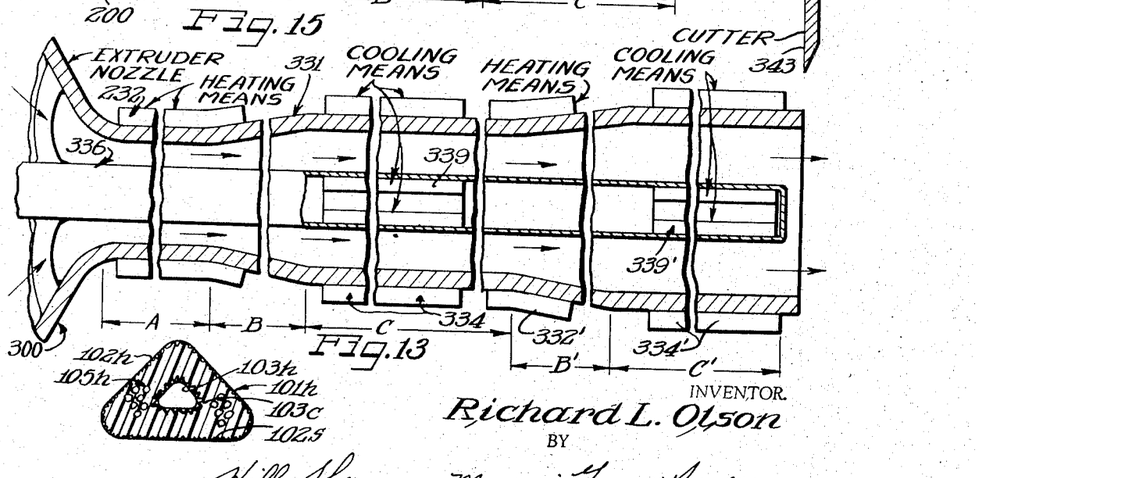
FIGURE 13 is a reduced scale and somewhat schematic transverse sectional view generally like FIGURE 7, showing that the body or bodies may be of other than circular cross-section, especially for non-torsional primary deformation.
FIGURE 15 is a partial schematic view generally like, and showing certain modifications of, FIGURE 14.

For simplicity of illustration, such cylindrical shapes are shown herein for all cases with the exception of FIGURE 13. However, it is desirable that all such bodies have at least one, and preferably both, of their axial ends 4 (FIG. 2) cut as described herein. For no waste of material in the cutting of a continuously extruded and shaped elongated form, it is desirable that these end cuts 4C (FIGS. 2, 3, 5 and 6) be substantially perpendicular to the said parallel sides.

It is also desirable that these axial ends be so formed or separated from the elongated continuous extruded form that they have (or at least one of them has) a skin-free surface or a surface free of any local or additional stiffening or discontinuity-causing means. It is also important to note that such end surfaces desirably have a surface condition providing a very useful and special resistance to wear of many kinds or to failure by tearing, cutting, abrasion, fatigue, or other causes. This condition is provided by the irregular outer profiles or contours formed by the various exposed generally spherical and outwardly-opening concavities of the intercepted or cut-through bubbles and their inter-walls. As noted above, the continuous outer phase plastic or (preferably) elastomer forming the walls between the bubbles is not interrupted so as to weaken it, as would be true in cases like a sponge's open cells. Thus strength and yieldable wear resistance are provided right up to the very outer limit of the skinless surface, which thickness is only that of the bubble inter-walls. Such end surfaces are particularly important and desirable where they are to be deformed or stressed in service, and especially if they are to be at least partly unconfined or exposed in service or in their assembly condition.

In certain cases, such skinless surfaces may be provided at one or both of the sides of such bodies, either in the initial shape forming or by a suitable cutting or abrading away of the skin by suitable techniques known in the art.

It will be apparent that such surfaces as 4c of FIGURE 2 and their several special properties are most accurately and aptly described as "cut," regardless of just how such a surface is made.

In FIGURES 1 and 2, the body 1 is shown as having on its outer sides 2 a preferably (but not necessarily in all of the broader aspects hereof) integral skin or relatively thin but thickened or denser surface region which progressively and relatively smoothly merges into the adjacent weaker or less stiff bubbles. Preferably such a skin is formed in molding or during the continuous extrusion and shaping. It here has a smooth molded type outer surface and is here (and elsewhere herein) shown by an inwardly irregular line to indicate the above-noted merging. This skin is here designated as 2S. As will be apparent, it prevents unduly abrupt stress discontinuities and may advantageously locally strengthen the body at and adjacent to a bonded, cemented, or frictionally secured surface (in contrast to the cut axial ends of this FIGURE 2).

Figure 3:
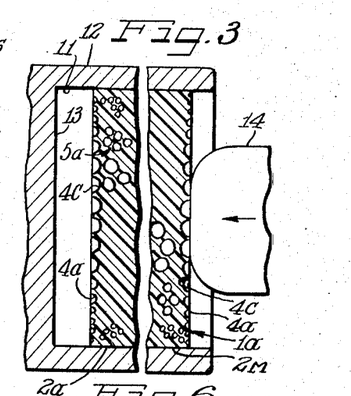
FIGURE 3 is a longitudinal section generally like FIGURE 2, taken through an assembly or device including a body generally similar in shape but differing from that of FIGURE 2.
Figure 5:
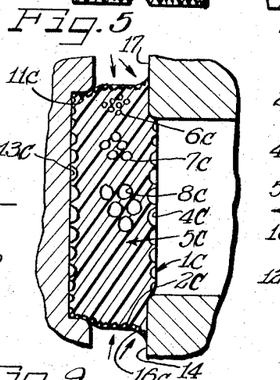
FIGURE 5 is also a longitudinal section like FIGURE 2, taken through an assembly of a seal or valve type device including a body of the same general shape but differing from that of FIGURES 2, 3 and 4.
Figure 6:
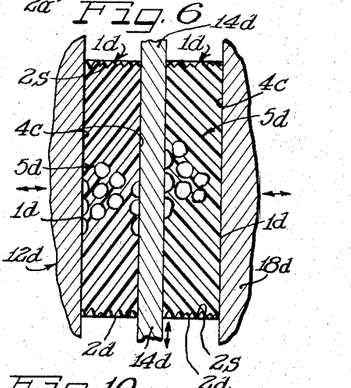
FIGURE 6 is also a longitudinal section like FIGURE 2, schematically or generally showing still another category of applications, taken through an assembly or device, and including a body of the same general and extrudable shape but differing from FIGURES 2 to 5, inclusive.
Figures 7, 9, 10:
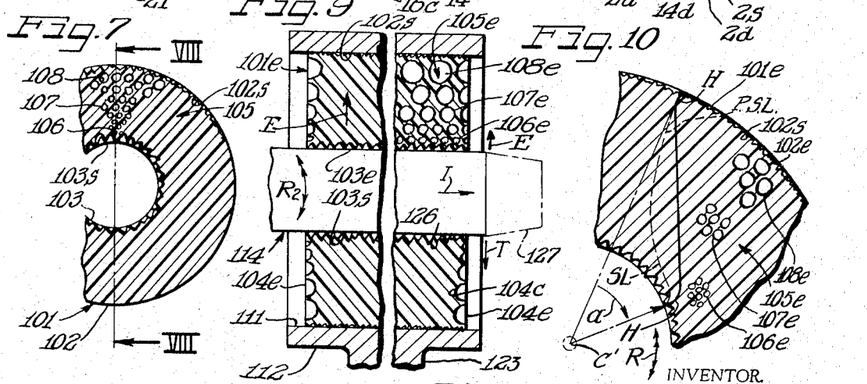
FIGURE 7 is a partially broken-away transverse section (generally like FIGURE 1) through a different or generally ring-like type of general shape of body according to this invention.
FIGURE 9 is a longitudinal section generally like FIGURE 8, taken through an assembly or device including a body generally similar in shape but differing from that of FIGURE 8.
FIGURE 10 is a partially broken-away, enlarged, and fragmentary sectional view generally like FIGURE 7, showing the same general shape of body as FIGURE 9, but differing in certain features thereof.
Figures 8, 11, 12, 14:
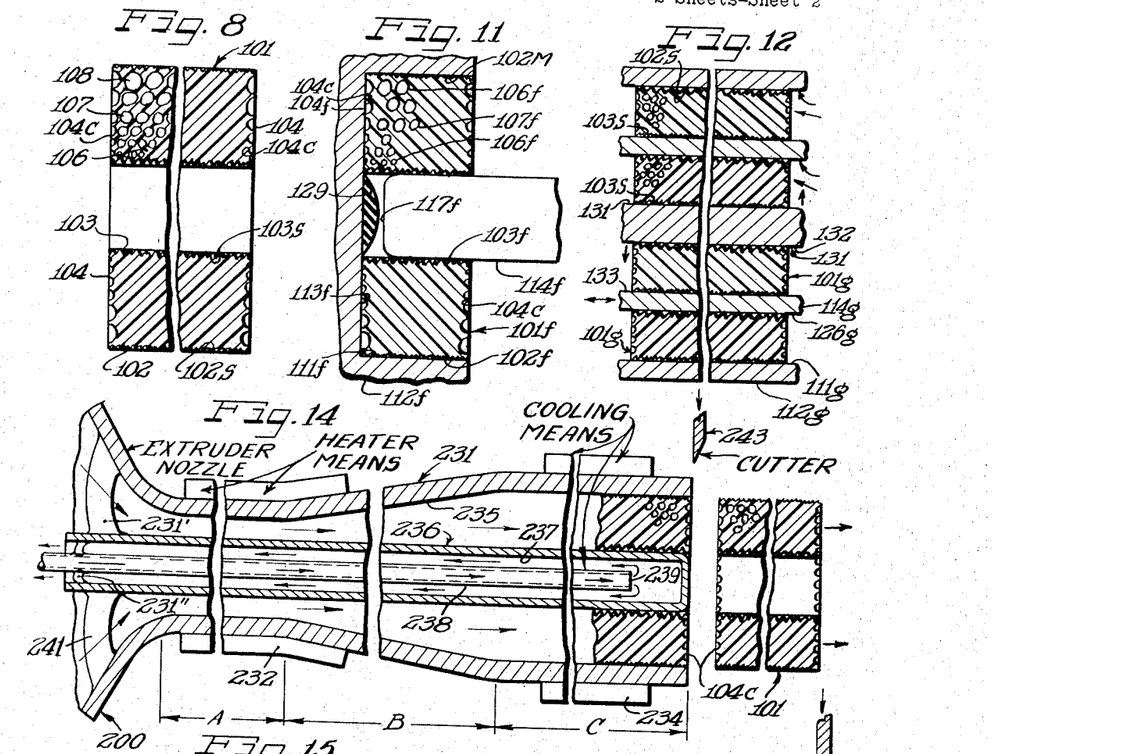
FIGURE 8 is a partially broken-away longitudinal or axially central section through the same body as FIGURE 7, and taken on the line VIII—VIII of FIGURE 1.
FIGURE 11 is a longitudinal section generally like FIGURE 8, taken through an assembly or device including a body generally similar in shape but differing in certain features from that of FIGURES 8, 9 and 10.
FIGURE 12 is a longitudinal section generally like FIGURE 8, taken through an assembly or device including two generally concentric bodies generally similar in shape to, but differing in proportions or features from, the bodies of FIGURES 8 to 11, inclusive.
FIGURE 14 is a schematic production flow diagram (which is not to proportionate scale except as noted) and generally longitudinal sectional view generally like FIGURE 8, showing certain successive operations and steps, and indicating the apparatus therefor.

FIGURES 3, 5 and 6 show certain of the possible assembly types or arrangements and also indicate certain of the possible ways of deforming or distorting bodies generally like that of FIGURES 1 and 2 and also like FIGURES 7 and 8.

In FIGURE 3, the body, designated as a whole by 1a, is here shown as having ends 4a (like the cut surfaces 4c). Its outer surfaces or sides 2a do not have the skin of FIGURE 1, but instead are formed with a molded smooth (non-irregular) outer surface, here shown by only a thin line, and designated as 2M, which may be formed during the heretofore described continuous extrusion and shaping by known techniques. It is thicker than a cut surface but is much thinner than a usual skin, being at most two times the bubble inter-wall thickness.

FIGURE 3 also shows one general type of assembly in which the body 1a, generally like 1 and here preferably of at least a partially elastic or elastomeric material, has its outer periphery (around its walls 2a) resiliently compressed to be inserted into the smaller diameter but generally corresponding recess 11 in the female more rigid member 12, which may have the closed (or vented) end wall portion 13, as shown. Such an assembly may have various uses. When so assembled into member 12, the body 1a may be operatively engaged and resiliently distorted in diaphragm-like fashion by a plunger or the like, shown by the second more rigid member 14. This distortion may be permanent if 1a is of a generally nonelastic plastic. Alternatively, body 1a may have at least its central portion compressed between end 13 and the engaging member 14, with an end of 1a normally engaging or operatively secured to end 13, or else as shown and also distorted like a diaphragm, which it is in this form.

In this last case, if the gas pressure is high enough so that its compression forms a material part of the total force (or relative to the resistance to distortion of the elastomer), then this device forms a spring with a progressively increasing spring rate (due to the gas compression), which may be modified by a progressively increasing engaged area from a tapered or curved nose of member 14. This gives results similar to those disclosed and claimed in my S.N. 123,917.

In this connection, it may be noted that the proportions of body 1a or the ratio of its axial length (not shown) to its diameter may be widely varied for different uses. Further, the outer walls 2a of body 1a may be secured or locked in place in recess 11, as by bonding, by cementing, or by a static friction grip maintained by the resilient outward pressure of elastomeric body 1a. Alternatively, body 1a may be slidable in recess 11 as a piston or the like to compress a fluid therein, and may be actuated by member 14, which may be permanently secured to an end 4C of body 1a and of any desired diameter or size.

FIGURE 5 shows another possible type of assembly for a body generally like 1. Here body 1c is shown as having the axial ends 4 with cut surfaces 4C (like FIGURE 2). However, here at least part of the outer walls 2c are also shown as cut surfaces 2C. This cutting may be by any known techniques, including shearing in cutting dies, abrading when rigidified by extreme cold. Body 1c may be thin or of short axial length to form a diaphragm-like device, and may be used as a diaphragm.

In this assembly type of FIGURE 5, female, more rigid member 12c has a correspondingly shaped recess 11c, which may be shallow as shown and with the integral end wall 13c (either closed or vented). Body 1c is suitably compressed in this smaller recess 11c and suitably secured (like 1a of FIGURE 3) at its side walls 2c to the recess walls and also, if desired, similarly by its end wall 4c to the end wall 13c. The other end of 1c is distorted and compressed (resiliently if 1c is an elastomer, as is preferred) by engagement with the axial end of the second more rigid member 14, here a hollow or tubular portion.

As shown by the arrows, fluid pressure may distort the cut sides 2C as shown, to form a lip seal 16c with its two dihedral angle surfaces both cut. The action is like that disclosed and claimed in my S.N. 123,917. Here this assembly is a seal, valve, or the like. As an example, this may be a simple faucet valve. Body 1c may be ring-like, as disclosed below. Similarly, the seal member or valve sealing member 1c may be ring-like and have its lip seal and its two cut dihedral surfaces at the juncture of its end with its radial inner wall. The concavity 16c is formed by the adjacent, fluid pressure indicating arrows, these pressures are, of course, normal to the surfaces, all as disclosed in my copending application S.N. 123,917. This FIGURE 5 also shows by its arrows that there may be axial as well as lateral deformation of the body. It will also be apparent that there may be other types of relative motion or deformation, including rotary torsional motion, tilting and others.

Figure 4:
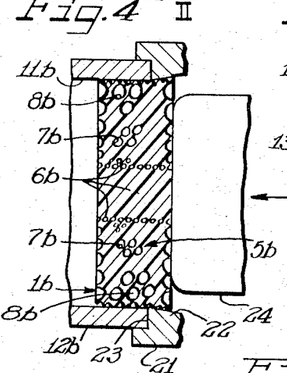
FIGURE 4 is also a longitudinal section like FIGURE 2, taken through and schematically illustrating as assembly operation and its fixtures for the outer compressing of a body generally similar in shape but differing from that of FIGURE 2 and FIGURE 3.

FIGURE 4 schematically illustrates one mode of assembly applicable to assemblies such as those of FIGURES 3 and 5 and also figures such as 9, 11 and 12. In this FIGURE 4, the body 1b is initially, or before assembly, larger in diameter than the recess 11b in the female rigid member 12 and into which it is to be assembled. This is similar to FIGURES 3 and 5. 21 designates as a whole schematically shown guide fixture to facilitate the entry and compression of the outer diameter or other periphery of body 1b. This fixture 21 has the conical or tapering inner surface 22 which may be suitably lubricated as by Teflon or by other suitable means to continuously supply a film of lubricant or parting fluid such as silicon. Fixture 21 has the angular seat portion 23 to neatly fit and engage over the ends of rigid body 12 to thus hold this fixture in position. Its operation will be apparent and it will be seen that it smoothly and progressively contracts or shortens the outer periphery of walls 2b as they slide along the suitably slope taper 22 when pushed by a suitable plunger-type member indicated schematically by 24.

FIGURE 6 shows still another category or type of uses and a corresponding assembly in which the extruded and cut end bodies 1d are connected in an axial series between at least three relatively movable rigid members 12d, 14d and 18d. It will be appreciated that only two such rigid members and one such disk-like body 1d may be employed here. As shown by arrows in this FIGURE 6, deformation of the bodies may be of various types including axial compression or tension, shear by rotary torsion or by eccentric motion, tilting and others as will be apparent to those skilled in this art. This three or more body system not only may have motions between such three or more bodies but such an arrangement may be used with only two rigid bodies.

The rigid members of such a stack are intended to be rigidly secured to the plastic or elastomeric bodies, as by bonding or cementing, to thus assure strong and intimate contact.

It is important to note that these rigid bodies, in addition to above-noted functions and their capabilities of being connected to suitable other members, may be considered as the transferring or cooling plates to remove heat from the elastomeric bodies when they are subjected to heat generating conditions in the elastomer, as by the absorption and conversion into heat of long continued and relatively high frequency vibrations or other conditions generating heat. These conditions are known in the art and may be in flutter dampers, vibration isolators, mounts for vibrating machinery and other such uses. In such cases, the rigid members may be metal plates of appreciable thickness to supply heat for short duration heat absorption into such plates. Also, these rigid members such as 12d, 14d and 18d, may be relatively thin and of metal such as copper or aluminum to efficiently conduct heat. In this case, they extend materially out beyond the sides of the bodies 1d to act like heat radiating fins to dissipate the heat into the air or into a forced air stream. In either such cooling case, it is desirable that the axial length or thickness of the bodies 1d be kept quite low (so that more of them are used if needed for a particular job) to thereby reduce the distance from any one point in the highly insulating gas bubble matrix to its cooled end surface.

In this FIGURE 6, the bodies 1d are the same, each having the bubbles indicated as a whole by 5d, the integral skin type and parallel side walls 2S, the cut axial ends 4C, and other features of the other figures hereof, if desired.

At this point it may be noted that the reference characters for like or related parts are coded for these figures and for those following. To this end, similar reference numbers are used for such related parts or features. Subscripts of a, b, c or the like are used to indicate different assemblies or species. The numbers are increased by 100 in the case of the hereinafter described ring-like members. It will be noted that S is used to indicate a skin while C is used to indicate the above described cut surface. Similarly, the M is used to indicate the very thin or nominal skin, as described above.

Turning now to the generally ring-like forms of this invention, it will be seen that FIGURES 7 and 8 show such a body. Broadly this body may be of any such general shape or configuration but preferably it has the cylindrical inner and outer side walls and the cut ends for economic production and the other advantages as discussed herein. The plastic or elastomeric body of FIGURES 7 and 8 is designated as a whole by 101. It has the cylindrical inner and outer side walls 102 and 103 which have the skin surfaces 103S and 102S, respectively with the skin 102S preferably being materially or much thinner than skin 103S for applications such as those of FIGURES 9, 11, 12 and the like. This body also has the similar perpendicularly cut ends 104 each having the cut surfaces 104C. It will be understood that its general proportions and its ratio of diameter to length as well as the ratio of its inner to its outer diameter may be varied quite widely for different uses or applications. Further, it is important to note that there may be a very much greater relative distance or ratio between its outer diameter and its inner diameter (for use particularly with torsional or axial shear) under this invention and with its bubble means than is possible in prior solid elastomers. This invention provides more nearly equal bubble deformation than is possible in a solid elastomer or in a solid plastic for permanent deformation.

FIGURE 9 illustrates another type of assembly and another general category of uses or applications under this invention. Here, the general organization includes an outer more rigid member having a female recess therein (of any suitable shape but preferably circular) into which the side walls 102e of the body 101e are to be fitted and tightly retained by a resilient pressure. They may be either bonded, cemented or held by a resiliently maintained static friction. At this point it may be noted that either the internal male member or an external and female member, may in certain cases have a relative sliding motion relative to the plastic or elastomeric body. This is intended to be included within this disclosure and with respect to all of its figures. However, it is preferred that the bodies be secured as described herein.

Continuing with respect to FIGURE 9, it will be noted that it has skins like FIGURE 7 at its radially inner and outer surfaces, these being designated as 103S and 102S, respectively. It also has the cut ends 104e with the cut surface 104C. As described relative to FIGURE 7, the inner skin is materially thicker or heavier than the outer skin to match the smaller inner area and its resulting stress concentration. The second, more rigid male member 114 has a cylindrical outer surface 126 suitably secured (as by cementing or by friction) to the inner wall 103e. The outer member 112 may have a projecting portion 123 whereby it is operated. An extension of 114 may supply this same function for the inner member.

At this point it is desired to discuss the possible arrangements of the effective bubble density, that is, the variations in their effectiveness by changes in their average sizes and/or in their spacings. Here it is to be noted that both these effects are usually given by the use of molding powder and thermal expansion as discussed in the above referenced patents and applications. However, it will be noted that relatively accurate control of this effective bubble density can be maintained by careful weighing and proportioning of the amount of powder used to supply the essentially nitrogen gas, which is preferred since it has less expansion with changes in temperature and also since it has less permeability into rubber and other such elastomers and plastic materials. Under certain aspects of this invention, the effective bubble densities may be relatively uniform throughout the major stressed regions. This will give certain of the benefits of this invention. Such an arrangement is shown, for example, in FIGURES 3 and 6.

However, in many cases and for the purposes and reasons outlined above, it is desirable to have different effective bubble densities in different deformed regions of such bodies, whether solid ring-like or of other forms. This is particularly true in cases where their shapes, their connections or other arrangements would give rise to objectionably varying deflections and resulting stress concentrations if the bodies were of a uniform plastic for permanent deformation and especially where the bodies are of an elastomer for spring-like action. Such arrangements may include two, three or more discrete layers of different bubble densities or a continuous progressive merging from one effective bubble concentration into another. Often this variation may be directly proportional to the changing deformation condition, such as the change in the radius as in certain of the devices disclosed herein.

Accordingly, FIGURES 1, 2, 4, 7, 8, 9, 10 and 11 illustrate such an arrangement of radially outwardly step-by-step or progressively and gradually increasing sizes (and/or increasing spacings between the bubbles) to thereby give reduced stiffness in a plastic or progressively reduced spring rates in an elastomer. Figures such as 12, 13 and others of the figures herein may use either this arrangement or the uniform bubble arrangement. It is to be noted that FIGURE 5 in its body 1c shows an inversion of this arrangement in which the maximum effective bubble density or the entire bubble region 5c is in the radially inner region 8c with the stiffer (lower size bubbles) out at the outer region 6c. It will also be noted that it is desirable in many cases to have solid plastic or solid elastomer in one region and this may progress by steps or in a continuously merging increase into more and more or more closely spaced bubbles to progressively increase the flexibility or reduce the durometer or stiffness. This last is illustrated, in body 1b of FIGURE 4 wherein the radially innermist region 6b is solid elastomer or solid plastic whereas regions 7b and the outermost region 8b have a progressively increasing bubble density. It will be understood that any of these arrangements, or others that would be apparent from this disclosure, may be used in these disclosed or in other assemblies or arrangements.

Turning now to one specific example to illustrate certain benefits to be derived from such arrangements, FIGURE 10 shows such a radially outwardly increase in effective bubble density in regions 106e, 107e, 108e, these regions together forming whole body of bubbles 105e of the ring-like body 101e. This figure shows an enlarged, fragmentary view of a portion of the body shown in FIGURE 9. FIGURE 10 illustrates, first, the very much greater angular or axial (or other), deflections permitted in a ring-like body of elastomeric material by the bubbles of this invention and even if these bubbles are uniformly distributed and of uniform sizes. Further and particularly, this figure shows the angular motion of the inner wall 103e relative to the outer wall 102e, this angular motion being indicated by the double headed arrow R and with its amount shown by the angle $a$ between the radii for the inner and outer walls taken about the center C'.

Here if the body 101e were of a uniform deformable material, such rotation would produce the prior art type shear line or shear curve such as that designated by the dashed shear line P, S, L. This last indicates the fact that the outermost elastomeric material does but very little work. Due to the larger diameter it is but little deflected. This gives the stress concentration shown since the maximum shear deflections occur at the concentrated region adjacent the radially inner surface or wall.

In contrast, the preferred arrangement of the bubbles according to this invention provides a lower spring rate as needed and permits more deflections in the outer regions. This gives results shown by the preferred shear line S, L. It will be appreciated that this uniform deflection and uniform stressing is like the condition occurring in the uniform shear between two paralled and axially moving members with an elastic body connected for shear between them.

This arrangement may provide a preferred optimum. The case where, as illustrated, the shear is uniform across the difference between the two radii for the inner and outer surfaces may be only approximated and yet be very useful. Material benefits are obtained when the deflections are made more nearly uniform.

Another interesting point to be noted is that the inner and outer skins 103S and 102S provide the hook ends H for the shear line or curve S, L. These hook portions are exaggerated and indicate the smoothly merging or progressive increase in the density of the elastomeric material (to thereby reduce its deflections) and strengthen it adjacent the bonded or otherwise secured walls. This prevents stress concentrations adjacent the secured surfaces and is another benefit of the bubble arrangements of this invention.

The different assembly type of FIGURE 11 shows an axial end connection for a generally ring-like body of the type shown in FIGURES 7 and 8 taken with the radial side wall connection to male member 114f. This may provide rotary torsional motion, axial motion, tilting or eccentric motion or others as will be understood. In addition, this figure discloses the above discussed inner and outer connections between the outer surface of inner male member 114f and the inner recess 111f of outer female member 112f. This last arrangement also permits all of the various types of relative motions. For this combined assembly wherein the end wall 113f is a part of the outer female member 112f is useful in various applications.

As one example, it may provide a useful engine mount or vibration absorbing unit for the mounting of engines or other vibrating equipment and wherein the weight of the unit may be carried axially, with this weight partially carried by a solid or bubble containing elastomeric, independent unit or end bumper 129 which engages against the inner end of rod-like or plunger-like male member 114f. In other uses, such an arrangement restrains undue axial movement with the weight of the mounted engine or the like being carried eccentrically and by the bubble elastomers. In such arrangements for energy absorption or vibration isolation it is desirable to have long travels as discussed above. It is usually often desirable to have the surfaces 111f, 113f and the periphery of 114f all securely bonded or cemented. This last is facilitated by this invention as described above. Stress concentrations are avoided adjacent such bonds thereby preventing failure in the bonded region here or in other devices disclosed herein.

FIGURE 12 shows another general type of arrangement for ring-like members wherein they may be in generally concentric series. While the three or more rigid members 112G, 114G and 131 are shown as overlapping, it will be understood that they may be actually offset if desired. This case is somewhat analogous to the contrasting axial stack of FIGURE 6. Like FIGURE 6 this assembly may provide independent or differential motions for the several rigid members. The motions may be of various known types, as indicated in part by the arrows used in this figure. Additionally, the rigid or metal members such as 112G, 114G and 132 may be used to provide cooling heat sinks or for continuous heat removal as explained in connection with FIGURE 6. In such case these heat sinks for temporary use may also be radiating fins or the like. In such cases they are preferably quite thin or as laminae and of suitable metals such as copper, aluminum or the like. As shown, the bubbles in the two or more concentric bodies may be either uniform or varied as above and the surfaces are bonded, cemented or frictionally retained, all as described above. This FIGURE 12 may be considered as showing a diaphragm with cooling inserts.

FIGURE 13 shows a transverse cross-section through another possible form of generally ring-like body under this invention. Here, the generally triangular and rounded corner inner and outer walls 103h and 102h each have the skins 103S 102S, respectively. Such an arrangement may be useful to permit only a small or a limited amount of torsional oscillation in an assembly for primarily axial tilting or other deformation. In general, this figure shows that the cross-section may be of numerous other shapes and circular. It is also to be noted that such other shapes may be readily extruded and otherwise handled in the assembly procedures as described for the circular cross-section forms.

Several possible modes of assembly under this invention are described here since such bodies (as of solid, hollow or of other forms) might have first been made of other processes.

In general, the assemblies procedures under this invention may be either by permanently changing the shape of the plastic elastomeric body which is accomplished by softening to an at least partially flowable condition and then permanently distorting the bubble inter-walls. This is often by a thermal or heating process in the case of thermoplastic or thermoplastic elastomers. In contrast, the deformation for assembly may be by elastic deformation of the body so as to change its size to fit it into a smaller or a larger recess of the rigid member. It will be apparent that the assembly may include a mixture of these two types of processes.

As an example of the physical distortion type of assembly which is economically accomplished at room temperature, attention is directed to the above-noted assembly procedure as shown in FIGURE 4. Here the initially larger outer periphery of walls 2b is compressively reduced to fit the body into the smaller recess 11b and to thereafter maintain a resiliently outward pressure which is important in facilitating good cementing or gluing. Such procedures may be employed to advantage for the outer walls of solid bodies or for ring-like bodies.

Another and different type of physical deformation assembly at room temperature assembly is shown for example in FIGURE 9 wherein the periphery of the outer walls 102b is increased by stretching. This stretching is done by insertion of the larger inner male member 114 which also retains this permanent elastic deformation to thereby maintain the desired radially outward pressure of the walls 102e against recess 111e. Here then the outer walls are increased in periphery or diameter in contrast to their decrease in FIGURE 4.

The assembly methods for arrangement such as FIGURE 6 will be obvious and need be but little discussed since they can readily be accomplished by light clamping to give light but adequate pressures to provide adequate cemented or otherwise bonded joints.

In general, where an inner male member like 114 is to be operatively secured in and to radially inner walls such as 103e of FIGURE 9 such an assembly is usually preferably accomplished by forcing the male member (often with a suitable tapered entry fixture temporarily secured thereon) to thereby stretch and enlarge the usually denser and higher spring rate interior portion of the ring-like member. This higher elastomeric density and higher spring rate cooperates with this stretching to give a higher unit pressure maintained and directed radially inwardly against the male member, such as 114. This higher pressure may desirably be approximately inversely proportional to the smaller engaged area on 114 (relative to larger area at 111). This provides for the correspondingly higher unit loads per square inch at 114 as contrasted with the larger area engaged by the outer walls 102e.

This inner stretching may be employed together with various ways of assembling the outer surface whether they be physical, thermal or other. In most cases, it is desirable to first insert the plastic or preferably elastomeric body in the outer female member and then subsequently, or in some cases, simultaneously force in the male member to stretch in inside. As shown in FIGURE 9, this assembly method with its stretching may be facilitated by a suitable tapered fixture secured in known or conventional fashion to the entry end of the male member. This is schematically shown by the fixture 127' wherein the taper is exaggerated. Here it is intended that this tapered surface be suitably lubricated as by a coating of Teflon or by the application of friction reducing parting fluids or the like in known fashion.

As noted above, assembling may also be done by permanent bulk deformation or by change in shape size of the bubble inter-walls while these inter-walls are in a softened or somewhat plastic state. Often this involves a limited or controlled heating to partially resoften the thermoplastic type material to the extent necessary so that this thermal type bulk deformation and assembly may be accomplished without breaking the bubbles. Preferably, with many materials this limited heating is a second stage heating or a resoftening after the bubble matrix has been chilled or set to be strong enough to maintain bubble integrity. As one example of this procedure, the outer or female member 112 of FIGURE 9 might be heated to a desired temperature (taking account of its specific heat and mass) and the initially smaller diameter body 101e readily somewhat loosely or easily inserted therein.

In such case, it is contemplated that the body may be previously made by any suitable means including molding. Also the process may use the set of a liquid type plastic as by a catalyst or the like. This set is to give it at least enough rigidity or strength to preserve the integrity of the bubbles or to prevent their bursting into one another.

Thereafter and in preferred two stage processes, the bubble matrix is again softened sufficiently (or else not fully set) so that internal gas pressure (conveniently produced by the thermal expansion of the gas or fluid in the bubbles) causes an enlarging type deformation. It will be appreciated that in their softened condition there might alternatively be a contraction or reduction in diameter of the bubbles under a compressing action such as that shown in FIGURE 4. This last would be quite useful in many cases and it is contemplated herein. While such two stage operations are preferred, yet one stage operations (performed with only one softening or one heating and during the initial forming of the article) may be used with a number of materials.

However, in general this softened state (usually by a thermal method) is used to increase the size by bulk deformation. Therefore, it is most useful for increasing the outer diameter of body like that of FIGURE 1 or like that of FIGURE 7.

While the entire plastic or elastomeric body might be heated and the entire body thus expanded within the broader view of this invention yet it is preferred that only the radially outer regions (or some one specific region) be heated while other regions are retained could to prevent expansion thereof. Thus there is preferably a selective deformation or expansion in only one region of the body.

This is particularly advantageous for an assembly of the type shown in FIGURE 7 or of the type shown in FIGURES 11, 12 and the like since it produces larger bubbles (or more or effective bubble density) to thus more greatly reduce the spring rate in the radially outer regions. Here then, the initial or the second stage expansion of the bubbles in this particular region (and more particularly in the radially outer region) may be accomplished as part of the assembly and by means of heating the female member to supply the desired amount of heat for the time X temperature reaction for this softening and expansion. To this end, the specific heat, and mass of the heated part determine the temperature to which it (the female member) should be heated. The receiving time X temperature will vary for different plastics or elastomers and for different types of bubbles.

Alternatively, this second stage expansion for this softening thermal method for forming of the larger outer bubbles and also to bring the body up to a larger size to resiliently fit in an initially larger female member may all be accomplished in another or separate sleeve, die, mold or the like. This may be of a suitable thinness or of a suitable mass and suitably heated to a desired temperature for this purpose. In such case, to facilitate removal of the plastic body after its second stage expansion in this auxiliary mold or the like, it is desirable to lubricate the surface of the plastic (or preferably elastomeric body) or else lubricate the mold by suitable means. One desirable such means and procedure is to coat the previously extruded and cut bodies (made in accordance with the following portions of the specifications) with a very fine mica or other suitable or known lubricants. This coating may be effected by spraying or dipping in a suspension, dusting including electrostatic methods (with the surface made conductive) or by other known procedures. Further, such procedures may be used in the mold but the coating of the body is desirable where it is available. As noted below, mica and talc and other finely particulate materials (not including carbon or graphite) causes thicker skin formation where there is a material further soft state expansion of the bubble matrix.

The thus lubricated body is then put into the auxiliary sleeve, mold or the like. It may be only partly confined in some cases. In others it may be wholly confined, as in a mold, if the expansion and the resulting pressures are to be material. The lubricant thus applied facilitates removal of the body from such a mold particularly where it is materially heated and further expanded therein, as is desirable in such cases. After this the thus expanded and shaped body is assembled into a female rigid member by known procedures including such physical deformation methods as that shown in connection with FIGURE 4 and described above. This procedure is quite desirable to reshape or change the shape of an extruded and cut body into a non-extrudable shape and/or to form skins on only certain surfaces as noted below.

Another example of a room temperature, physical or bulk distortion type of assembly combined or mixed with a softening or thermal type of assembly would be the thermal expansion, preferably in situ, of body 101e of FIGURE 9 in and then the compressive fitting into the recess 111 of female member 112 by the heat of a correct temperature initially given to female member 112. Thereafter, the male member 114 may be readily inserted by reason of its taper entry fixture 127' or the like to thereby stretch the inner wall 103e. This results in resiliently maintained radially outward pressures in the bubble matrix on outer surface 111 and radially inward pressures on 114 and with a materially greater unit pressure corresponding to the small area and higher unit forces of the inner surface 114.

It is also to be noted that the ease with which an assembly can be made and the speed with which it can be done has an important effect on the speed and total cost of assembly in mass production. This ease or facility of assembly is often quite important. It will be appreciated that this forms an important part of the objects of this invention and of the desirable features achieved thereby. It will be further apparent that the foregoing procedures lend themselves to easy and fast assembly and mass production and by known types of automatic handling and positioning equipment, working at high speed.

Turning now to the preferred continuous extrusion and shaping while moving along within confining walls together with successive cutting as lowest cost procedure for mass production, attention is directed to FIGURES 14 and 15 showing different possible arrangements and procedures of this type.

FIGURE 14 is in part a production flow diagram and, in part, a generally schematic non-proportioned view showing successive operations and only indicating the types of apparatus therefor. In this figure, an extruding nozzle is designated as a whole by 200. It will be understood that this extruder may be of any desired or known type suitable for the plastic or elastomeric material to be used. It is particularly to be noted that in almost all cases it is important that there be no material or appreciable blowing of the molding powder within the extruder itself or before the mix reaches the shaping tube. Thus temperatures must be controlled in the extruder. In many cases it may be cooled.

It is also to be understood that the bubbles may be formed by other means as injection of a gas or the like into the extruder adjacent to its discharge or in the initial portion of the shaping tube. This last may be employed in certain cases in lieu of the use of a blown powder.

As will be well understood by those skilled in the art and is also indicated in certain of the above referenced patents, it is intended that bubble forming material, such as the suitable blowing powder, be very carefully and accurately proportioned into the mix of the preferably previously adequately milled plastic or elastomeric compound. This accurate proportioning may be either by a batch method or by a known continuous method which may include accurate weighing for greater accuracy in this procedure.

The extruder nozzle 200 is suitably (and preferably directly) connected to extruding tube means here designated as a whole by 231 for its outer portion and designated as a whole by 236 for its inner tubular or core portion to shape the radially inner side walls of the resulting bodies. Such connections should be able to carry the extruding pressures, which will necessarily be quite high for certain materials and for a long tube.

While these extrusions and continuous shaping techniques and procedures are here described in connection with thermal methods for use with thermoplastics or thermoplastic elastomers, yet it will be understood that they may be modified to utilize catalytic or acid type setting type plastics or elastomers. In such a case, the supply of catalysts or the point at which they react will take the place of the chilling means which achieves the setting in the forms specifically discussed here.

As shown in FIGURE 14, there is an initial preferably straight section A wherein there is no lateral expansion. This is followed by a suitable length of outwardly conical or expanding, section B. This is, in turn, followed by another preferably straight (or in some cases even constricting) section C which is shown as continuing to the end or final discharge point and the conventional cutter, flying shear or the like 243.

It will be apparent that the smooth outer surface of 236 shapes the radially inner wall and the smooth inner surface 235 of outer tube member 231 shapes the radially outer walls of the bodies as they are being continuously extrusively pushed along and shaped or while moving in this tube member and while their bubbles are being formed and selectively enlarged as disclosed herein.

A conventional or any suitable type of heating means designed as a whole by 232 is shown as extending throughout a material portion of the initial straight portion A to adequately heat and soften the thermal plastic material to sufficient flow stage before expansion is started. The total length of apparatus of FIGURES 14 and 15 may be materially reduced if the heating stages use the well known electronic or high frequency induction heating, which can act very rapidly indeed and also uniformly into special or selected regions or volumes.

This heat also forms the blowing powder into bubbles under a very completely confined condition. At this point it may be noted that there is no problem of leakage or escape of gases (with the resulting difficulties) as occurs in the molding of bubbles in an elastomer by the use of normally closed molds. This initial forming of the incipient or small bubbles under this confined condition and under the often very high extrusion pressure produces the initial bubbles in very small sizes and prevents the extruded expansion thereof, as discussed in the above referenced patents. Further, this confined condition may if desired be used to prevent formation of skin on the inner surface or on the outer side surface unless such skin is desired.

At this point, it may be observed that while the formation of skin in these cases is a complex phenomena yet it is largely caused by an uncontrolled, unconfined or free type expansion, whereby the bubbles close to the expanding free surface break through or into each other and the surface material is thus divested of bubbles and collapsed into a denser form when it hits the outer confining walls of the mold or the like. It will be apparent that such conditions may be precluded here if desired. It will further be seen that a suitable thickness of skin may be formed on the inner and usually more highly stressed radial surface. If desired either no skin at all or else a skin with a materially lesser thickness can be so made on the radially outer surface. This may be done by providing for a predetermined and abrupt slope initial expansion for a controlled amount of skin forming, motion of the inner or outer surface. This may be done either in the initial region A or subsequently.

These effects may be provided by having an abrupt or steep slope type enlargement in the sectional area of the shaping tube 231.

The arrangement shown is, in general, one to produce little or no skin. However, such modifications will be understood by those skilled in this art from this disclosure.

The heating means 232 may, if desired, be extended at least part way along the outwardly conical or expanded section B. It will be noted that the several sections A, B, C are smoothly one into another without abrupt changes in curvature and that their length degree of slope and the like may be varied materially for different materials, different sizes or percentage of bubbles and other conditions. It is also to be understood that in certain cases it may be desired to achieve a corresponding expansion by having an inward taper or reduction in cross-section area of the inner or tube 236. An abrupt such inward-expansion may be used to give a radially inner skin. Such an inner taper (for either skin forming expansion or for slow expansion) may be employed alone or in conjunction with the outward taper shown in FIGURES 14 and 15. Such variations are not shown here for simplicity of illustration.

After the expansion in the progressively expanding bubbles and outwardly tapering or expanding section B, the moving or elongated body enters generally straight and final section C wherein it is adequately chilled to set it into its final form or into an at least partially set form for subsequent expansion. This further expansion may be in situ in the female member or otherwise as discussed above.

Preferably the cutter, which may be of any suitable type is closely adjacent to the end. It may actively cooperate with the end tube 231 in a shearing relation. It acts to successively cut off bodies, such as 101, in a predetermined spaced relation and of a corresponding axial lengths. While not shown, it is understood that suitable and known automatic handling equipment will carry bodies 101 away from this cutter. It is to be noted that a high speed rotating razor sharp wheel is a desirable type of cutter for the soft, low apparent durometer conditions given by this matrix of gas filled bubbles. Such a wheel may be radially moved in and out in a suitable time sequence. The very high speed of this very sharp razor type edge produces the general effect of cutting a harder and more easily and smoothly cut material.

In the above described FIGURE 14, if a uniformly mixed bubble forming material or powder is used, as preferred, and it is heated generally uniformly throughout and its expansion then stopped by being chilled rather uniformly throughout its volume, then there will be a substantially uniform effective density of the initially formed bubbles. The final or effective sizes and distributions of the bubbles will also be controlled by the amount of expansion permitted in a particular region. This is quite useful as disclosed above.

However, it is preferred to achieve a material increase in the effective density or size of the bubbles in a particular region. This is here shown as the radially outer region. For this reason the heating means is shown as applied to the outside while the subsequent cooling and stiffening means is applied at both the outside as well as at the inside. Thus in this time-X-temperature reaction, more heat is applied and for a longer time to the radially outer regions to cause more bubble expansion there as the outer confining walls diverge to prevent this expansion.

This inside cooling means is here somewhat schematically illustrated as a cooling water or refrigeration gas system of the type wherein the inner tube carries a suitable cooling liquid or a compressed refrigerant gas inside of and in spaced relation from, the sides of tube 236. This coolant is released or expands at the end 239 and flows back in reverse direction to be progressively heated as it abstracts heat from the externally heated mix. Thus, if desired there may well be materially less cooling back in stage A than in stage B and stage B may have materially less cooling than stage C.

This arrangement with more softening and more expansion in the outer regions will produce larger bubbles in the radially outer regions. In many cases, this is also accompanied by closer spacing between the bubbles as more particles of the blowing powder are effectively blown. It will be noted that this arrangement is characterized by having continuously extruded softened and elongated body being shaped within confining walls while in motion and while it is heated and softened essentially only or more in its outer regions and either not heated or preferably cooled in its inner regions. Thus there is here a radially outward heating and a radially inward cooling of this moving mix.

Looking at another aspect of this arrangement, it will be apparent that, if desired, radially inner portions of this material may be heated and softened back in section A and beyond by heat coming in from the outer heating means 232 while this same inner portion is cooled downstream by the inner cooling means 239. Further, the outer portion is cooled by the outer cooling means. Thus, there is an axial spacing in the direction of flow of a heating means and then a downstream cooling means. As shown, this may be for the entire moving shape or for only one region thereof. Here this action is also shown as during the formation of bubbles in selective sizes in different regions. These two effects or arrangements are both included in the apparatus of FIGURE 15 and are inherent in its method.

FIGURE 15 schematically shows an arrangement which may include initial parts which are identical or similar to those discussed above. Thus, FIGURE 15 includes the extruder nozzle 300 suitably connected to the elongated shaping tube 331 having the inner tube 339. In both FIGURES 14 and 15, the inner core tube may be accurately centered and rigidly held by a suitable number of vanes or radially spaced spider-like members such as 231' and 231" respectively. These serve to rigidly center and connect the inner and outer portions of this tube structure as will be well understood by those skilled in this art. A plurality of axially spaced such spiders may be used, preferably upstream of the shaping parts of this tube assembly.

It will be apparent that stages A, B and C of FIGURE 15 are or may be generally similar to FIGURE 14. As shown, heater means 332 corresponds to 232. Here however, the downstream and inner cooling means 339 is shown as located entirely downstream or in section C in contrast to FIGURE 14 and its possible cooling in section B and also its possible cooling in section A.

The initial three sections A, B and C of FIGURE 15 will form the initial bubbles or the incipient bubbles in section A and progressively expand them to a desired initial amount under always confined control to prevent bursting in tapering section B. Then the mix is at least partially chilled to at least partially strengthen and set the inter-bubble walls (to preserve bubble integrity) in section C by reason of its radially inner and outer cooling means 334 and 339. Thus this arrangement and process up to this point has produced larger bubbles in a selected region, which is here the radially outside region.

If desired, another or second stage of a different type may be added. This is shown by the second expanding or outwardly tapering section B' which is preceded by the second heating and softening means 332'. If desired, this second heating means 332' may extend at least partly into the outwardly tapering portion as shown for heating means 332. After an adequate time spent in the heating means and in the expanding region to achieve the desired but controlled expansion of the bubbles, the moving elongated body goes into a smoothly merging outer straight (or even slightly constricted) final section C' wherein it is chilled and set in both its radially inner and outer regions. It is important to note that the second and radially inner cooling means 339' may be extended upstream so that its effective start is substantially coincident with, or close after, the second heating means 332'. This is illustrated in FIGURE 15. The cutter 343, its action and subsequent handling equipment are intended to be as described above in connection with FIGURE 14.

It will be apparent that the apparatus and method of FIGURE 14 may be considered as a three stage expansion or with two different periods of controlled expansion in differing regions along the shaping tube to give an expansion and enlargement of bubbles in a selected region of the bodies. Here, the outermost bubbles are selectively expanded in section B, and after chilling and a gain of partial strength (so that these bubbles do not burst one into the other), they can be materially more expanded (without rupture) in the second expanding section B'. This second or subsequent expansion here (and in other cases under this invention) is thus partially more like an elastic expansion since it is partly restrained by the strength of the partly stiffened inter-walls as they prevent bursting of the bubbles.

For certain plastic or elastomeric material and bubble forming mixes, which require a longer heating or a higher time-X-temperature (for their softening and for the starting of the generally exothermic reaction where a bubble forming powder is used), the shaping tube may be quite long. While the required heat may be put in quite rapidly as by the above noted electronic or radio frequency capacitive heating yet even the partial heat removal or chilling to (cool and set enough for safe removal at the outer end adjacent cutter 243 or 343) requires time or a corresponding length of tube. For other materials, such for examples as polyurethane, a shorter shaping and expanding tube may be used by reason of the faster and lower temperature heating and the correspondingly faster cooling.

There will be a progressive pressure drop in and along the moving mix (as it converts into a more and more rigid moving body or mass) due to the partly viscous and partly rubbing type friction against the confining walls. It will be understood that only outer confining walls need be used if a non-hollow shape (like that of FIGURE 1) is to be extruded and shaped. This propelling pressure (which may be quite high for certain materials) is supplied by the extruder. This material (and often high) pressure which decreases along the length of the forming and bubble expanding tube assembly is advantageous in that is intially (or whole high) prevents material expansion of the bubbles to thus keep them quite small. Thus the bubble forming powder is triggered and reacts exothermically to produce very small bubbles which are allowed to expand slowly and under control (to prevent bursting) as the pressure drops. Thus the bubble gas expansion helps propel the mix and body along the tube. The pressure drop and expansion are further controlled or localized by the tapering sections (whether outward, inward or both) materially increase the pressure drop along the tube.

In order to reduce the initial pressure (and the propelling power needed) the confining walls of the tube assembly should be made smooth and slippery. Also in many cases, suitable lubrication should be provided. This may include known or suitable lubricants and application means. As an example the confining walls may have bonded on Teflon or the like in cases or regions where the flow pressures do not extrude the Teflon itself. Other examples may include spaced passages leading into the confining walls around their peripheries and also spaced axially with a suitable lubricant (such as a silicone parting liquid resistant to the temperatures used) metered in and injected under pressure, either steadily or in pulses.

A thin coating of finely divided particulate material such as mica or talc, but not graphite or other carbon material, serves not only as a lubricant to facilitate but also to form a thicker skin when such a material is applied to an outer surface of the above described body of plastic (or elastomer) or to a confining wall therefor before a material expansion of the bubbles in the softened matrix. This expansion may be the initial and bubble forming expansion in a one stage process or one of the subsequent or second stage expansions described above.

More or a thicker coat of such particulate material provides a thicker skin as compared to a materially thinner coating or to no such coating. It is believed that the thicker skin is formed by bursting of the bubbles on the particulate material as the softened inter-walls between the bubbles expand out and hit a confining wall. Mica in the form of very fine flakes is preferred. As indicated above, such a particulate material coating can be applied by dusting (including known electrostatic coating techniques) spraying with or dipping in a suspension in a suitable liquid to be dried (including water) and other suitable or known coating processes. Such applications may be made to the partially formed body before it is put into the mold or the like for its subsequent stage expansion as described above. In such a case, the coating may be applied to the interior of such a mold for the same purpose.

Its lubricating action to facilitate removal after expansion is noted above. Also such coatings may also be applied to desired portions of the inner or the outer confining walls of the forming and shaping tube of FIGURES 14 and 15. Such applications should be upstream of the final expansion. The flowable particulate material may be injected or forced in under high pressure by suitable spaced passages from an outer layer about the moving mass of plastic or elastomer. In general it may be forced in like, or in lieu of, the lubricant as described above. It will thus be understood that such particulate coatings provide a second and preferred method and means for the forming of a materially thicker skin in one surface area (particularly an area which is normally more highly stressed per unit area in service) than in another surface area (which is normally more lightly stressed per unit area in service). In certain cases, for example where the unit stresses on the more lightly loaded surface are suitably low, it may have very little skin thickness, like surface type M as described above. Also in such cases, it may have no skin at all or be a cut surface C which is suitably secured by cement or friction. It will be apparent that the coating method for making different skin thicknesses (or a skin and no skin) may be used above or in combination with the other method of controlling the region in which the expansion and skin forming is to take place.

It is also to be noted that the particulate and skin forming material such as talc or mica (which may be used in a mold or in the extruder tube) will remain loosely or removably embedded or clinging in the outer surface of the skin that it helped to form. Thus, the thicker skin on the more highly unit stressed inner periphery of a ring-like elastomeric bubble body will have a thicker such embedded deposit than will the thinner skin on the more lightly unit stressed radially outer surface. In certain cases there may be no skin and no such deposit for the lightly stressed outer surface. Such loosely embedded or clinging mica, talc or the like in its two different thicknesses becomes part of the article at least temporarily or permanently, as desired. It may be of use as a lubricant or the like. For example, the thicker layer of lubricating talc or mica on the inside of the ring-like body will give more lubricant (as needed) for its high stretch and stressing as it is forced over a male member in final assembly. This is in contrast to the materially lesser unit deformation of the radially outer surface and skin as it is assembled (as by peripheral compression) into its female member. It will be seen that the lesser or no thickness of such talc or mica gives a generally corresponding amount of lubricant. Such talc or mica may be left in place in such as assembly to become embedded in an initially soft and then hardened cement or the like.

This arrangement is commercially valuable in many cases including torsional or axially movable bushing springs or the like. It will be apparent that it provides much lower locked in stresses than would be the case where both inner and outer peripheries are stretched. There is greater resistance to failure by fatigue or rupture. Another advantage is the more economical utilization of material.

A valuable feature of the annular bubble-elastomer structures of this invention is that where the outer periphery is compressed and the inner wall peripherally stretched there is a reversal of stress toward the interior of the body and through a zero stress point.

As noted above, various cross-sectional shapes may be extruded by these or analogous methods and apparatus. As will be further noted that the subsequent stage heating, either in situ, in the female member of the final assembly or in a separate mold or the like, may be used as still another expansion stages after the selective or regional expansion of FIGURE 14 or of FIGURE 15. It will also be noted that the above-described expansion of a previously extruded bubble body in a separate and heated mold is very useful where a previously and economically extruded, parallel sided body is to be changed into another shape such as a non-extrudable shape or to have a thicker skin formed on a particular surface thereof, including a previously cut surface.

It is also to be noted that silicone type rubbers are particularly desirable for certain applications of the invention, not only because of their high temperature resistance but, also because of their superior bubble forming and bubble holding or retaining properties.

It will also be apparent to those skilled in the art that the fluid, and especially low gauge pressure gas filled bubbles in elastomeric bodies according to this invention will permit very much larger deflections in practical devices than has been possible heretofor. For example, torsional deflections in spin in assemblies (such as those of FIGURE 9) may be quite large and even more than one complete revolution in certain cases. Looking at this same point from another approach, it will be seen that the devices like FIGURE 9 may have a very much larger ratio of outer diameter (O.D.) to inner diameter (I.D.) to give this large rotary travel. This may also be accompanied by the relatively or completely uniform shear as indicated in FIGURE 10.

It will be evident to those skilled in the art that the present invention (or a useful portion thereof) may be advantageously employed not only in the types of applications or uses mentioned above but in others which may become known, and particularly those having problems similar or related to those mentioned herein. It will also be so evident that this present invention, or a part thereof, may be modified in numerous ways, including the use of other or known materials, bubble-forming or charging techniques, and other extrusion or like methods and subsequent steps.

I claim as my invention:
1. A body of plastic material of substantial resilience having at least two different surfaces to be operatively engaged between two substantially rigid and relatively movable members in service to deform said body, which would produce an objectionable stress concentration in one region;
   said body being unitary and having means, for substantially equalizing deformations thereof comprising relatively larger volumetric ratio of readily deformable fluid-filled bubbles in the strength-providing continuous outer phase matrix of said plastic material, and lower volumetric ratio of said bubbles toward the center of the body;
   said bubbles being located within said body to reduce the stress concentration of said one region by reducing the effective bulk stiffness and permitting more deformation in another region to thereby make the deformations more nearly equal throughout the major deformed regions of said body, for lower cost and more efficient utilization of the plastic material.
2. The body of claim 1 which includes
   gas as at least part of the fluid in said bubbles and at least one surface which cuts through said bubbles and through the continuous walls between said bubbles to provide an exposed surface to be deformed in service which is resistant to failure by tearing or by abrasion and which is irregular and free of any stiffening regions.
3. The body of claim 1 which is
   a diaphragm-like body of elastomeric material,
   having general flat parallel ends,
   having said bubbles adjacent its outer sides between said ends, and
   merging into a substantially solid bubble-free central region.
4. A generally ring-like assembly comprising substantially rigid male and female elements and a unitary elastomeric body having radially inner and outer surfaces;
   said body being adapted to be elastically deformed in shear between its radially inner and outer surfaces which are operatively secured to corresponding outer and inner surfaces, respectively, of said male and female elements,
   said body comprising, at least in its radially outward portions adjacent to said radially outer surface, stiffness-reducing, separate, fluid-filled bubbles in the matrix of the outer phase elastomer,
   said bubbles materially reducing the effective springy stiffness of said radially outward portions and materially increasing their deflection in torsional shear.
5. The assembly of claim 4, in which said bubbles increase substantially progressively in size from closely adjacent to said radially inner surface of the body to substantially said radially outer surface of the body to provide generally equal shear deflections per unit length of radius outwardly through said body, and shear stresses per unit of sheared area which are generally proportional to the radial distance outward from said radially inner surface.
6. As an article of manufacture a predetermined shaped body which is unitary and to be deformed in service between two relatively movable members,
   said body being of plastic material and having, in at least in a substantial region thereof, fluid containing bubbles in the non-interrupted strength providing outer phase matrix of said plastic to decrease its stiffness in said region,
   said body having at least a first surface area thereof having a surface reinforcing, integral skin progressively merging into said bubble matrix,
   and said body having a second surface area,
   said first surface area of said body having material of the type of finely divided talc or mica removably embedded in the outer portion of its said skin.

7. In a device two substantially rigid elements and a body of plastic material of substantial resilience and having fluid filled bubbles therein separated by continuous walls
- one of said elements having a recess providing a circumscribing surface and having an open end;
- said body being at least partially in said recess and engaged by said circumscribing surface;
- said body having a face in the direction of said opening and which face cuts through said bubbles and through said continuous walls between the bubbles to provide an exposed surface adapted to be deformed in service and which is substantially resistant to failure by tearing or abrasion and which is irregular and substantially free from stiffening regions;
- and the other of said elements thrusting toward and engaging said face under pressure.

8. In a device relatively movable substantially rigid members and a body of plastic elastomer engaged by and between said members:
- one of said members having a generally cylindrical recess therein;
- said body being of generally cylindrical shape and having its radially outer surface engaging the cylindrical surface defining said recess;
- said body having gas filled bubbles in its radially outer portions;
- and said body being of originally substantially larger uncompressed outer diameter than the diameter of said cylindrical wall of the recess and the body being bulk compressed by bubble distortion and by compression of the gas in at least its radially outer gas-containing bubbles to shorten its periphery to fit in said wall without objectionable wrinkling and to maintain a resilient outward pressure toward said wall.

References Cited

UNITED STATES PATENTS

| | | | |
|---|---|---|---|
| 1,345,904 | 7/1920 | Wishart | 264—51 X |
| 2,206,757 | 7/1940 | Taladay | 264—48 |
| 2,304,717 | 12/1942 | Swart | 264—45 X |
| 2,381,380 | 8/1945 | Carter | 264—48 X |
| 2,425,567 | 8/1947 | Robinson | 248—22 X |
| 2,537,977 | 1/1951 | Dulmage | 264—53 |
| 2,737,503 | 3/1956 | Sprague et al. | 264—55 |
| 2,815,549 | 12/1957 | Olson | 22—10 |
| 2,857,625 | 10/1958 | Carlson | 264—53 |
| 2,863,186 | 12/1958 | Olson | 22—10 |
| 2,945,261 | 7/1960 | Aykanian et al. | 264—53 |
| 3,007,209 | 11/1961 | Roberts | 264—45 |
| 3,018,991 | 1/1962 | Slayter | 248—22 |
| 3,099,516 | 7/1963 | Henrickson | 264—48 |
| 3,121,129 | 2/1964 | Knowlton | 264—45 |
| 3,128,978 | 4/1964 | Sykes | 248—22 |
| 3,160,549 | 12/1964 | Caldwell et al. | 161—161 |
| 3,166,332 | 1/1965 | Olson | 277—171 |
| 3,170,972 | 2/1965 | Knipp et al. | 264—54 X |
| 3,173,826 | 3/1965 | Campbell et al. | 161—161 |

FOREIGN PATENTS

| | | |
|---|---|---|
| 732,713 | 6/1955 | Great Britain. |

JOHN PETO, *Primary Examiner.*

ALEXANDER H. BRODMERKEL, *Examiner.*

P. E. ANDERSON, *Assistant Examiner.*